United States Patent
Aksu

(10) Patent No.: US 9,913,282 B2
(45) Date of Patent: Mar. 6, 2018

(54) RECOMMENDING CHANNELS FOR ACCESSING AN UNLICENSED RADIO FREQUENCY SPECTRUM BAND

(71) Applicant: Verizon Patent and Licensing Inc., Arlington, VA (US)

(72) Inventor: Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 151 days.

(21) Appl. No.: 14/831,079

(22) Filed: Aug. 20, 2015

(65) Prior Publication Data

US 2017/0055268 A1    Feb. 23, 2017

(51) Int. Cl.
*H04B 7/208* (2006.01)
*H04B 17/02* (2006.01)
*H04W 72/04* (2009.01)
*H04W 16/14* (2009.01)

(52) U.S. Cl.
CPC ....... *H04W 72/0486* (2013.01); *H04W 16/14* (2013.01)

(58) Field of Classification Search
CPC . H04W 16/14; H04W 48/20; H04W 72/0486; H04W 88/06; H04W 28/085; H04W 36/30; H04W 74/002; H04L 43/0805; H04L 43/0882
USPC ... 370/328–331, 395.21, 468, 254–255, 344, 370/319, 431; 455/456.1
See application file for complete search history.

(56) References Cited

U.S. PATENT DOCUMENTS

| | | | | |
|---|---|---|---|---|
| 7,184,777 B2* | 2/2007 | Diener | ............... | H04L 41/0896 455/456.1 |
| 7,460,837 B2* | 12/2008 | Diener | ................ | H04B 17/23 455/39 |
| 8,654,741 B2* | 2/2014 | Lundsgaard | .......... | H04W 48/20 370/332 |
| 9,055,486 B2* | 6/2015 | Farhadi | ............... | H04W 16/14 |
| 2016/0095009 A1* | 3/2016 | Ling | ..................... | H04W 16/14 370/329 |
| 2017/0006479 A1* | 1/2017 | Smith | ................... | H04W 24/02 |

* cited by examiner

*Primary Examiner* — Hanh N Nguyen

(57) ABSTRACT

A device may receive channel monitoring information associated with an unlicensed radio frequency (RF) spectrum band. The device may determine channel availability information associated with one or more channels of the unlicensed RF spectrum band based on the channel monitoring information. The channel availability information may include one or more channel availability parameters, corresponding to the one or more channels, that indicate availability for communicating via the one or more channels. The device may receive, from an access point that provides network access via the unlicensed RF spectrum band, a request for a channel recommendation associated with the unlicensed RF spectrum band. The device may determine a set of recommended channels of the unlicensed RF spectrum band based on the channel availability information and the request for the channel recommendation. The device may provide, to the access point, information that identifies the set of recommended channels.

20 Claims, 5 Drawing Sheets

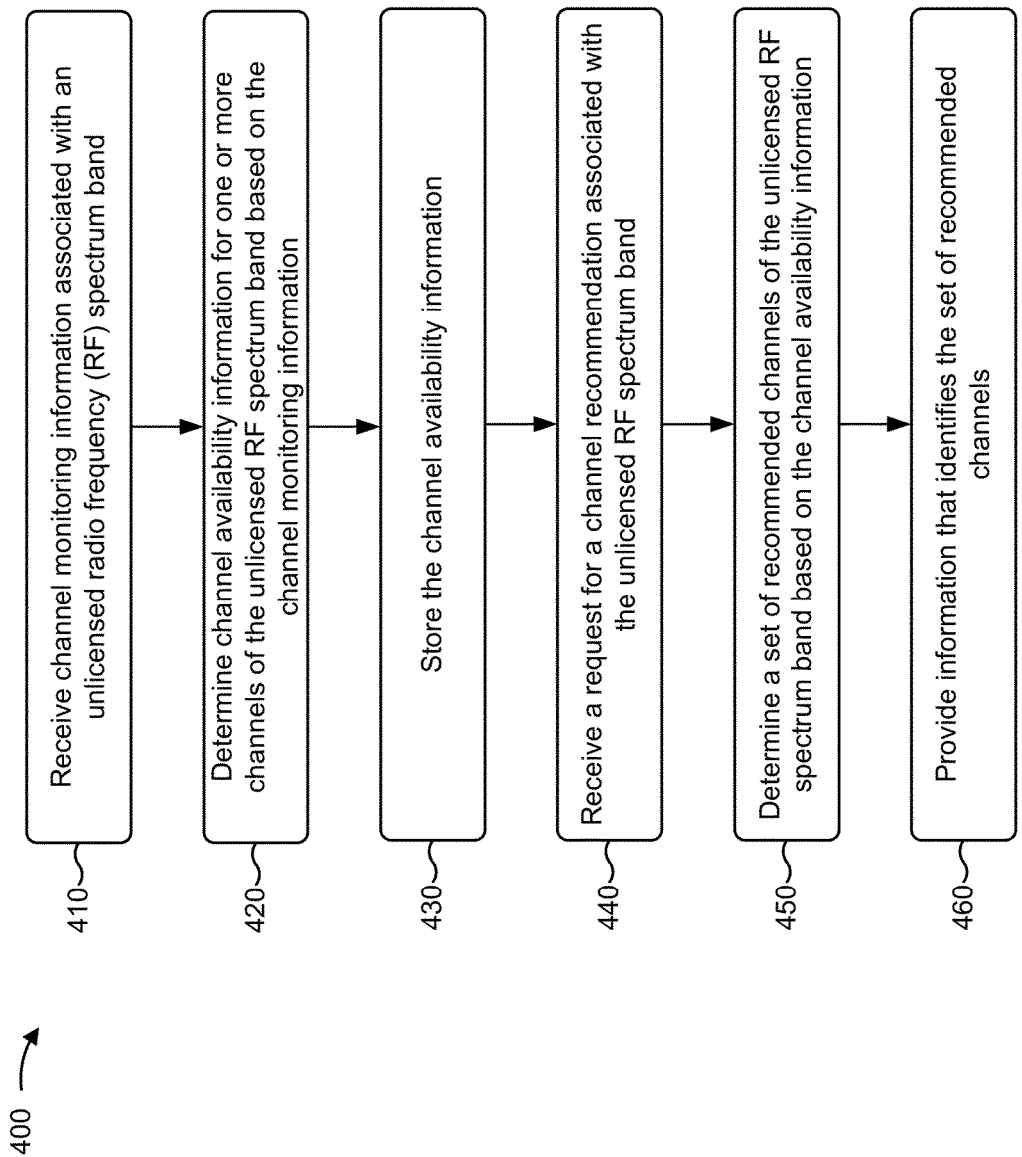

RECOMMENDING CHANNELS FOR ACCESSING AN UNLICENSED RADIO FREQUENCY SPECTRUM BAND

BACKGROUND

Wireless devices may communicate over an unlicensed radio frequency (RF) spectrum band using one or more radio access technologies, such as a Wi-Fi radio access technology, a long term evolution radio access technology, or the like. An unlicensed RF spectrum band may refer to an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. In other words, devices that use the unlicensed RF spectrum band must typically accept any radio interference caused by other devices that use the unlicensed RF spectrum band.

BRIEF DESCRIPTION OF THE DRAWINGS

FIG. 4 is a flow chart of an example process for recommending a set of channels for accessing an unlicensed radio frequency spectrum band.

DETAILED DESCRIPTION OF PREFERRED EMBODIMENTS

The following detailed description of example implementations refers to the accompanying drawings. The same reference numbers in different drawings may identify the same or similar elements.

A spectrum access system (SAS) may be used to assign radio frequency (RF) channels to user devices that communicate wirelessly using RF spectrum bands. For example, in the United States, the Federal Communications Commission (FCC) requires use of a SAS to assign RF channels to user devices that communicate via licensed RF spectrum bands (e.g., RF spectrum bands that have been licensed from the FCC by wireless operators, such as the 3.5 gigahertz (GHz) RF spectrum band). However, there is no requirement to assign RF channels to user devices that communicate using unlicensed RF spectrum bands (e.g., RF spectrum bands that have not been licensed and are open for shared use by any device that complies with regulatory agency rules for communicating via the RF spectrum bands, such as the 5 GHz RF spectrum band).

Assigning or recommending RF channels of an unlicensed RF spectrum band may be difficult because the SAS may not have information regarding availability, usage, occupancy, congestion, etc. associated with the unlicensed RF spectrum band. Implementations described herein assist with determining channel availability information associated with RF channels of an unlicensed RF spectrum band, and using the channel availability information to recommend a set of channels to be assigned to a user device requesting access to the unlicensed RF spectrum band. In this way, implementations described herein may increase network throughput, improve network reliability, increase network capacity, increase network coverage, etc., by intelligently assigning RF channels of an unlicensed RF spectrum band based on availability of the RF channels.

Figure 1A:
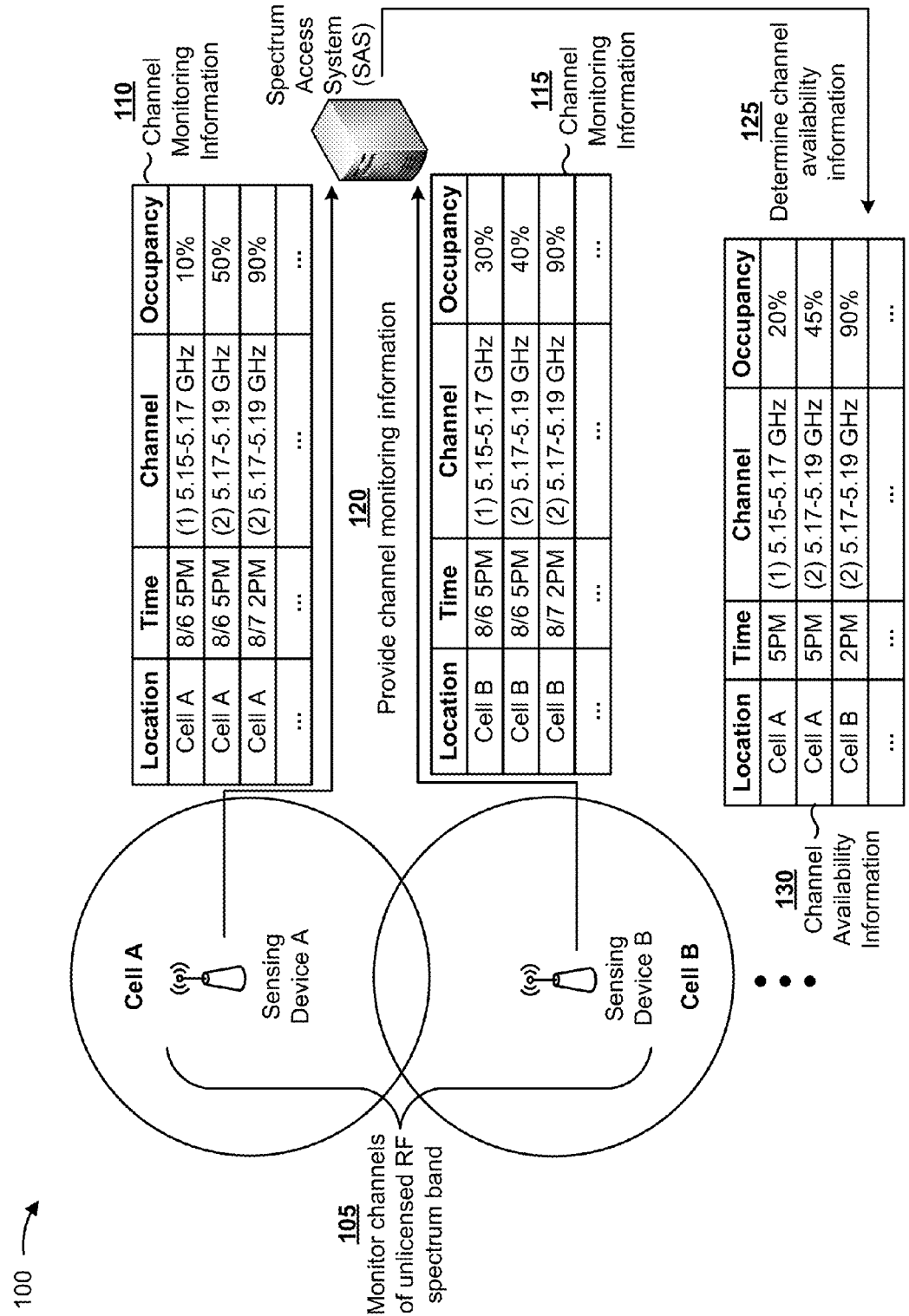
FIGS. 1A and 1B are diagrams of an overview of an example implementation described herein.
Figure 1B:
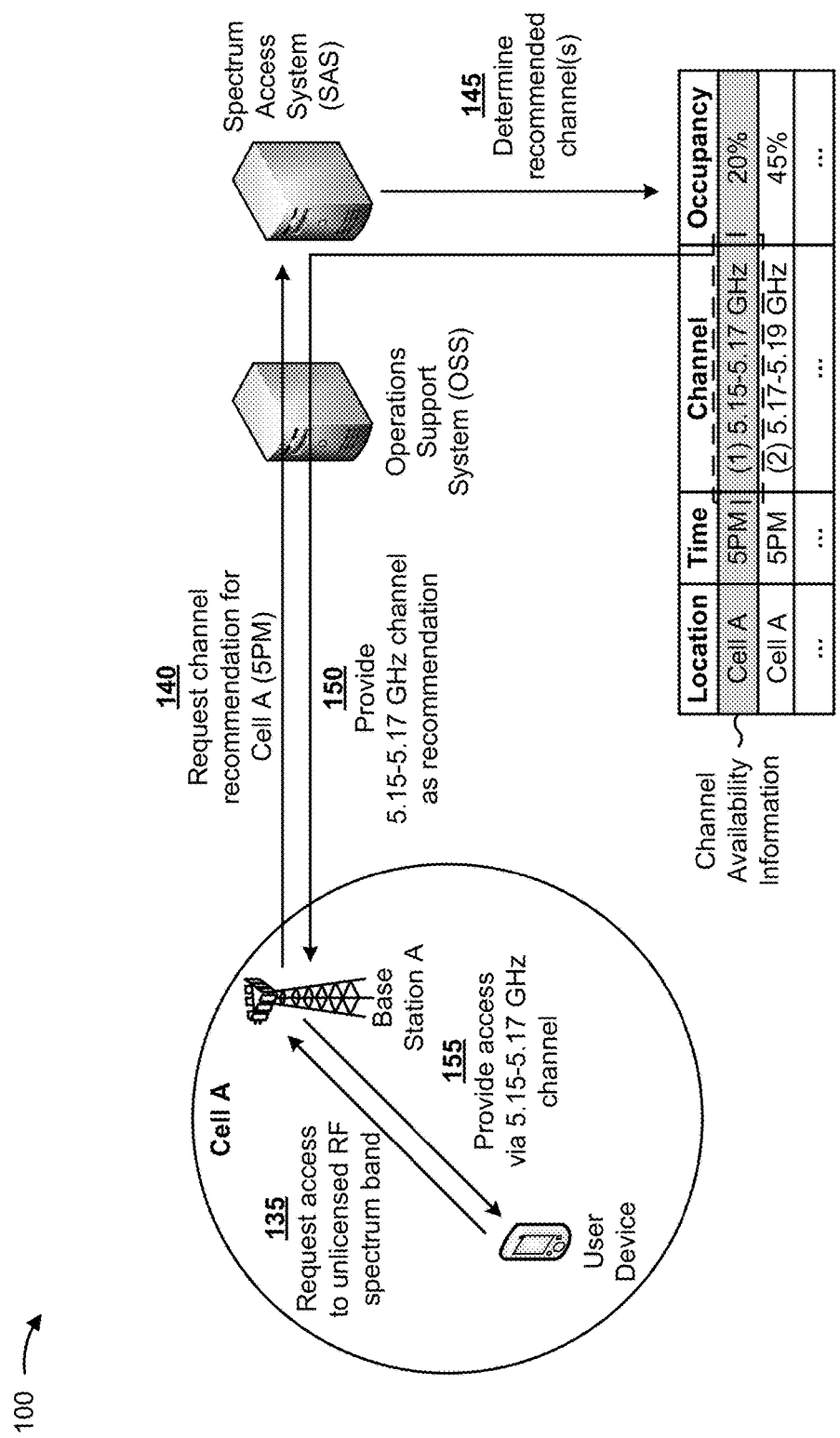

FIGS. 1A and 1B are diagrams of an overview of an example implementation 100 described herein. As shown in FIG. 1A, sensing devices may monitor channels of an unlicensed RF spectrum band to determine channel monitoring information associated with different geographic locations. For example, as shown by reference number 105, assume that a first sensing device, shown as Sensing Device A, monitors unlicensed RF channels in a first cell, shown as Cell A, and that a second sensing device, shown as Sensing Device B, monitors unlicensed RF channels in a second cell, shown as Cell B.

As shown by reference number 110, Sensing Device A determines channel monitoring information based on monitoring the unlicensed RF channels. The channel monitoring information identifies a location from which the channels are monitored, a time at which the monitoring (e.g., a measurement) took place, a channel that was monitored, and an availability of the channel. In example implementation 100, the availability is shown as a percent occupancy of the channel, although other channel availability parameters may be used.

The channel monitoring information may indicate an availability of a particular channel in a particular location at a particular time (e.g., based on measuring a noise level of the channel, an energy level of the channel, a signal quality of the channel, or the like, as described in more detail elsewhere herein). For example, Sensing Device A determines that a channel with a frequency range of 5.15 to 5.17 GHz (referred to below as "Channel 1" for simplicity) has 10% occupancy in Cell A on August 6 at 5 PM. Similarly, Sensing Device A determines that a channel with a frequency range of 5.17 to 5.19 GHz (referred to below as "Channel 2" for simplicity) has 50% occupancy in Cell A on August 6 at 5 PM. At a different time, shown as August 7 at 2 PM, Sensing Device A determines that Channel 2 has 90% occupancy in Cell A.

As shown by reference number 115, Sensing Device B determines channel monitoring information in a different location (e.g., Cell B). For example, Sensing Device B determines that Channel 1 has 30% occupancy in Cell B on August 6 at 5 PM. Similarly, Sensing Device B determines that Channel 2 has 40% occupancy in Cell B on August 6 at 5 PM. Later, on August 7 at 2 PM, Sensing Device B determines that Channel 2 has 90% occupancy in Cell B.

As shown by reference number 120, Sensing Device A and Sensing Device B (as well as other sensing devices, which are not shown) provide the channel monitoring information to a spectrum access system. As shown by reference number 125, the spectrum access system analyzes the channel monitoring information to determine channel availability information. For example, the spectrum access system may aggregate channel monitoring information associated with different locations, different times, etc. to generate the channel availability information. Additionally, or alternatively, the spectrum access system may apply a propagation model and/or may use network information, such as transmission powers associated with base stations, to determine the channel availability information, as described in more detail elsewhere herein.

As an example, because Cell A and Cell B overlap (e.g., some signals from Cell A propagate to a portion of Cell B, and vice versa), the spectrum access system may determine that a 10% occupancy of Channel 1, determined based on channel monitoring information associated with Cell A, and a 30% occupancy of Channel 1, determined based on channel monitoring information associated with Cell B, result in a 20% occupancy of Channel 1 in Cell A. The spectrum access system may store the determined channel availability information, as shown by reference number 130, and may use the stored channel availability information to recommend a set of channels (e.g., one or more channels) to provide access to the unlicensed RF spectrum band, as described in connection with FIG. 1B.

As shown in FIG. 1B, and by reference number 135, assume that a user device requests access to the unlicensed RF spectrum band (e.g., using a long term evolution in unlicensed spectrum (LTE-U) access technology). The request is sent to a base station (e.g., an access point for LTE-U communications), shown as Base Station A. As shown by reference number 140, Base Station A requests a channel recommendation for a coverage area served by Base Station A, which is shown as Cell A. Assume that the request for the channel recommendation is sent at 5 PM. Base Station A may send the request to an operations support system (OSS), which may send the request to the spectrum access system.

As shown by reference number 145, the spectrum access system may use the stored channel availability information to determine a recommended channel. For example, based on aggregated channel availability information (e.g., aggregated from different locations and at different times), the spectrum access system determines that Channel 1 is associated with a 20% occupancy in Cell A at 5 PM, and that Channel 2 is associated with a 45% occupancy in Cell A at 5 PM. Based on this channel availability information, the spectrum access system determines that Channel 1 has higher availability (e.g., lower occupancy) at the requested time. Thus, as shown by reference number 150, the spectrum access system provides, to Base Station A, a recommendation that access be provided using Channel 1 (e.g., the 5.15 to 5.17 GHz frequency range). As shown by reference number 155, based on the recommendation, Base Station A provides access to the unlicensed RF spectrum band for the user device via Channel 1.

In this way, the spectrum access system increases network throughput, network reliability, network capacity, and network coverage by recommending RF channels of an unlicensed RF spectrum band based on availability of the RF channels. Furthermore, the spectrum access system may prevent congested channels from becoming further congested.

As indicated above, FIGS. 1A and 1B are provided as an example. Other examples are possible and may differ from what was described in connection with FIGS. 1A and 1B. For example, the unlicensed RF channels may have different bandwidths or may include different frequency ranges, the channel monitoring information and/or the channel availability information may use additional channel availability parameters and/or different channel availability parameters than channel occupancy, or the like.

Figure 2:
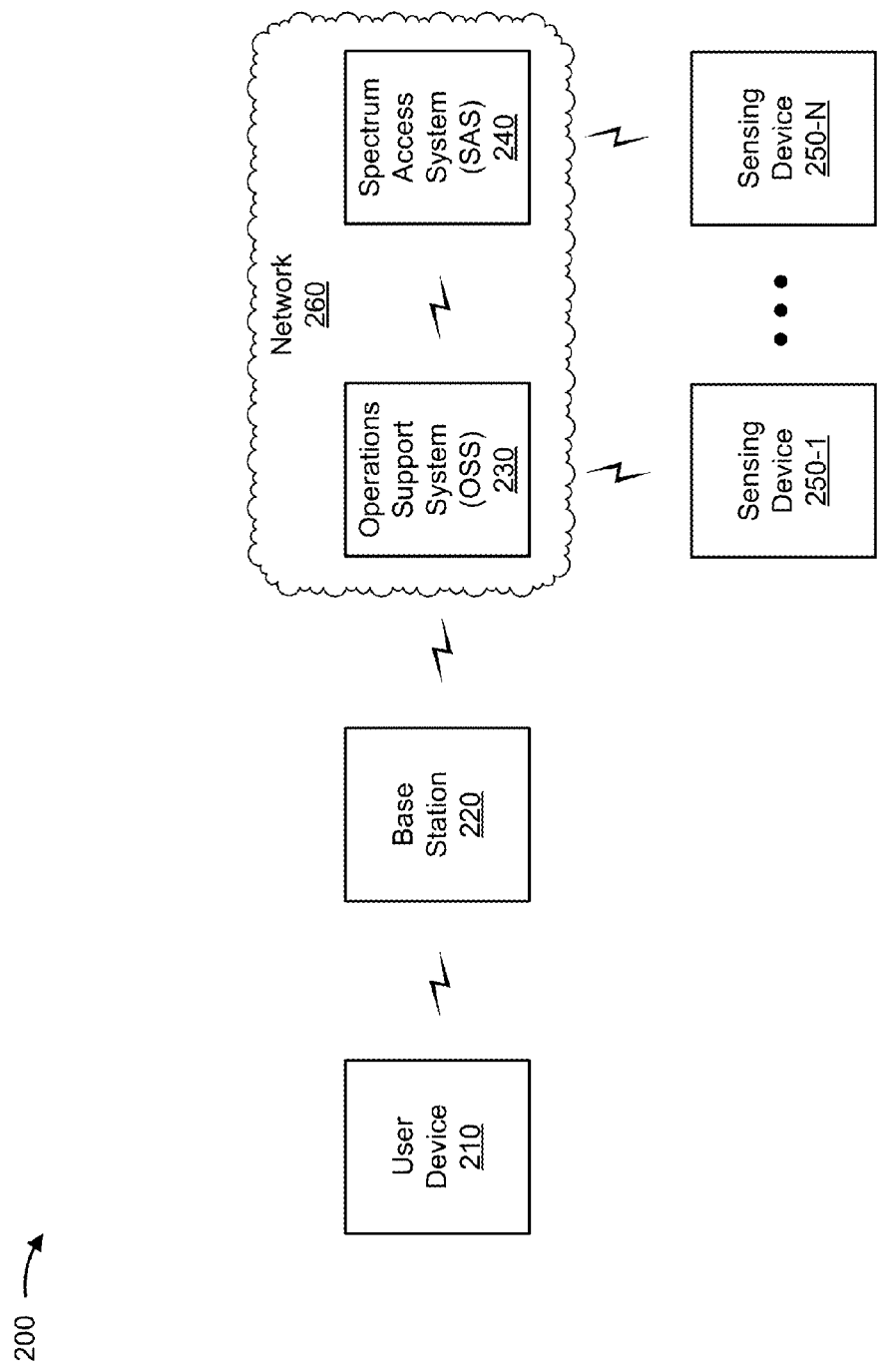
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a base station 220, an operations support system (OSS) 230, a spectrum access system (SAS) 240, one or more sensing devices 250-1 through 250-N (N≥1) (hereinafter referred to collectively as "sensing devices 250," and individually as "sensing device 250"), and a network 260. Devices of environment 200 may interconnect via wired connections, wireless connections, or a combination of wired and wireless connections.

User device 210 may include one or more devices capable of connecting to a network via a base station 220 and an unlicensed RF spectrum band. For example, user device 210 may include a communication device, such as a mobile phone (e.g., a smart phone, a radiotelephone, etc.), a laptop computer, a tablet computer, a gaming device, a wearable communication device (e.g., a smart wristwatch, a pair of smart eyeglasses, etc.), a machine-to-machine communication device, or a similar type of device.

Base station 220 may include one or more devices capable of communicating wirelessly (e.g., via an air interface) with user device 210 to transfer network traffic destined for and/or received from user device 210. In some implementations, base station 220 may include an evolved node B (eNB) associated with a long term evolution (LTE) network. Additionally, or alternatively, one or more base stations 220 may be associated with a radio access network (RAN) that is not associated with the LTE network. In some implementations, base station 220 may include a small cell base station, such as a base station of a microcell, a picocell, and/or a femto cell.

Base station 220 may communicate wirelessly with user device 210 using one or more wireless communication protocols, such as, for example, the Institute of Electrical and Electronics Engineers (IEEE) 802.11 protocol (e.g., Wi-Fi), an LTE-U protocol, or the like. Base station 220 may provide user device 210 with access to an unlicensed RF spectrum band to permit user device 210 to communicate using the unlicensed RF spectrum band. In some implementations, the unlicensed RF spectrum band may be used by base station 220 and user device 210 of a cellular network for Long Term Evolution (LTE) communications and/or LTE-Advanced (LTE-A) communications, and by Wi-Fi access points and Wi-Fi stations of a Wi-Fi network for Wi-Fi communications. The unlicensed RF spectrum band may be used by the cellular network in combination with, or independent from, a licensed RF spectrum band. In some implementations, the unlicensed RF spectrum band may be an RF spectrum band for which user device 210 may need to contend for access because the RF spectrum band is available, at least in part, for unlicensed use, such as Wi-Fi use.

As an example, the unlicensed RF spectrum band may include one or more radio frequencies (e.g., one or more radio frequency spectrum bands) included in the radio spectrum (e.g., the portion of the electromagnetic spectrum corresponding to radio frequencies, or frequencies lower than approximately 300 gigahertz (GHz)). In some implementations, the unlicensed RF spectrum band may include one or more RF spectrum bands that are open for shared use by any device that complies with regulatory agency rules (e.g., associated with a particular country) for communicating via the one or more RF spectrum bands. For example, the unlicensed RF spectrum band may include one or more radio frequencies between approximately 5 GHz and approximately 6 GHz. As a more specific example, the unlicensed RF spectrum band may include one or more radio frequencies between approximately 5.15 GHz and approximately 5.825 GHz.

As another example, the unlicensed RF spectrum band may include one or more RF spectrum bands defined by the United States Federal Communications Commission (FCC) as the Unlicensed National Information Infrastructure (U-NII) radio band. The U-NII radio band may include, for example, a first RF spectrum band between approximately 5.15 GHz and approximately 5.25 GHz (e.g., the U-NII Low band), a second RF spectrum band between approximately 5.25 GHz and approximately 5.35 GHz (e.g., the U-NII Mid band), a third RF spectrum band between approximately 5.47 GHz and approximately 5.725 GHz (e.g., the U-NII Worldwide band), and/or a fourth RF spectrum band between approximately 5.725 GHz and approximately 5.825 GHz (e.g., the U-NII Upper band).

The unlicensed RF spectrum band may be divided into RF channels via which RF communications may be transmitted. For example, the unlicensed RF spectrum band may include one or more channels of approximately 20 MHz bandwidth. User device 210 may communicate via an RF channel included in the unlicensed RF spectrum band. For example, user device 210 may communicate via an RF channel using a Wi-Fi radio access technology, an LTE radio access technology, or the like.

Operations support system 230 may include one or more devices capable of monitoring, controlling, analyzing, and/or managing devices associated with a telecommunications provider network, such as network 260. For example, operations support system 230 may include a server (e.g., included in a data center, a cloud computing environment, or the like) or a similar type of device. In some implementations, operations support system 230 may assist with configuring base station 220.

Spectrum access system 240 may include one or more devices capable of monitoring, controlling, analyzing, and/or managing access to a licensed RF spectrum band and/or an unlicensed RF spectrum band. For example, spectrum access system 240 may include a server (e.g., included in a data center, a cloud computing environment, or the like) or a similar type of device.

Sensing device 250 may include one or more devices capable of receiving, generating, storing, processing, and/or providing channel monitoring information (e.g., based on monitoring RF channels, such as RF channels of an unlicensed RF spectrum band). For example, sensing device 250 may include a sensor (e.g., a wireless sensor, an RF channel sensor, an RF spectrum analyzer, a Wi-Fi spectrum analyzer, etc.) or a similar type of device. In some implementations, sensing device 250 may be co-located with base station 220.

Network 260 may include one or more wired and/or wireless networks. For example, network 260 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
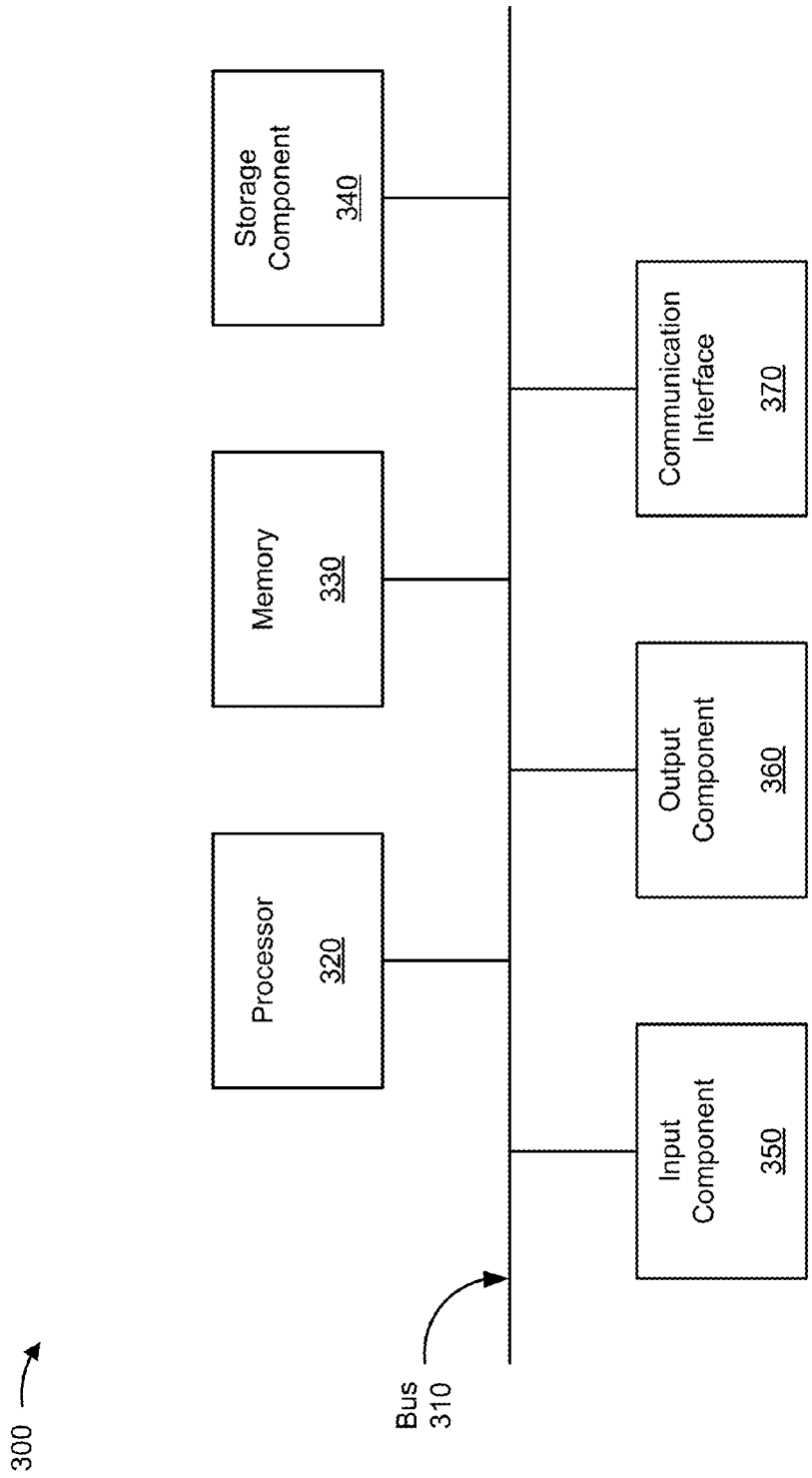
FIG. 3 is a diagram of example components of one or more devices of FIG. 2.

FIG. 3 is a diagram of example components of a device 300. Device 300 may correspond to user device 210, base station 220, operations support system 230, spectrum access system 240, and/or sensing device 250. In some implementations, user device 210, base station 220, operations support system 230, spectrum access system 240, and/or sensing device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for recommending a set of channels for accessing an unlicensed radio frequency spectrum band. In some implementations, one or more process blocks of FIG. 4 may be performed by spectrum access system 240. In some implementations, one or more process blocks of FIG. 4 may be performed by another device or a group of devices separate from or including spectrum access system 240, such as user device 210, base station 220, operations support system 230, and/or sensing device 250.

As shown in FIG. 4, process 400 may include receiving channel monitoring information associated with an unlicensed radio frequency (RF) spectrum band (block 410). For example, spectrum access system 240 may receive channel monitoring information. The channel monitoring information may include, for example, a channel identifier that identifies an unlicensed RF channel that has been monitored. For example, the channel identifier may identify a frequency range associated with a channel of the unlicensed RF spectrum band (e.g., a frequency range from 5.15 GHz to 5.17 GHz, from 5.17 GHz to 5.19 GHz, etc.). A channel may have various bandwidths, such as 1.4 megahertz (MHz), 3 MHz, 5 MHz, 10 MHz, 15 MHz, 20 MHz, or the like.

Additionally, or alternatively, the channel monitoring information may include a location identifier that identifies a location from which an unlicensed RF channel is monitored, such as a geographic location (e.g., a geographic region), a cell of a cellular network (e.g., using a cell identifier), a base station 220 (e.g., using a base station identifier), or the like. Spectrum access system 240 may use the location identifier to associate a location with channel availability of one or more unlicensed RF channels at that location.

Additionally, or alternatively, the channel monitoring information may include a time identifier that identifies a date and/or a time at which an unlicensed RF channel is monitored. For example, the time identifier may include a timestamp or a similar identifier. Spectrum access system 240 may use the time identifier to associate a time with channel availability of one or more unlicensed RF channels at that time.

Additionally, or alternatively, the channel monitoring information may include a channel availability parameter that indicates channel availability of an unlicensed RF channel. The channel availability parameter may be determined based on monitoring the unlicensed RF channel (e.g., by sensing device 250). For example, the channel availability parameter may include a signal strength parameter associated with the unlicensed RF channel (e.g., a received signal strength indicator (RSSI), a received channel power indicator (RCPI), etc.), a signal quality parameter associated with the unlicensed RF channel (e.g., a signal to interference plus noise ratio (SINR), etc.), or the like.

In some implementations, the channel availability parameter may include an occupancy parameter determined based on detecting an energy level associated with the unlicensed RF channel, based on detecting a noise level associated with the unlicensed RF channel, based on a quantity of preambles detected on the unlicensed RF channel, based on detecting congestion and/or usage of the unlicensed RF channel, based on assigning the unlicensed RF channel for use by user device 210, based on providing or receiving a recommendation of an unlicensed RF channel for assignment to user device 210, or the like. In some implementations, the channel availability parameter may be represented as a percentage (e.g., an availability percentage, an occupancy percentage, etc.).

As an example, the channel monitoring information may include a channel identifier that identifies an unlicensed RF channel, a location identifier that identifies a location at which the unlicensed RF channel was monitored, a time identifier that identifies a time at which the unlicensed RF channel was monitored, and a channel availability parameter that indicates an availability of the unlicensed RF channel at the location and the time. Using the channel monitoring information, spectrum access system 240 may make recommendations regarding unlicensed RF channels to assign for a particular location and time, as described below.

In some implementations, spectrum access system 240 may receive channel availability information from one or more sensing devices 250. For example, multiple sensing devices 250 may monitor multiple unlicensed RF channels to determine channel availability parameters at different locations and at different times. Sensing device(s) 250 may provide the channel availability information to spectrum access system 240 (e.g., periodically).

Additionally, or alternatively, spectrum access system 240 may receive channel availability information from one or more base stations 220. For example, base station 220 may monitor unlicensed RF channels, as described above with respect to sensing device 250. As another example, base station 220 may assign unlicensed RF channels for use by user device(s) 210, may receive recommendations for unlicensed RF channel assignments from spectrum access system 240, or the like. Base station 220 may use this information to generate a channel availability parameter, and may provide the channel availability parameter, along with other channel monitoring information, to spectrum access system 240.

As further shown in FIG. 4, process 400 may include determining channel availability information for one or more channels of the unlicensed RF spectrum band based on the channel monitoring information (block 420), and storing the channel availability information (block 430). For example, spectrum access system 240 may determine channel availability information for unlicensed RF channels based on the channel monitoring information (e.g., received from sensing device(s) 250 and/or base station(s) 220). The channel availability information may indicate an availability for accessing an unlicensed RF channel (e.g., based on a channel availability parameter) at a particular location (e.g., a region) and at a particular time (e.g., a time period). Spectrum access system 240 may store the channel availability information in a data structure local to and/or accessible by spectrum access system 240.

In some implementations, the channel availability information may be based on a single channel availability parameter included in received channel monitoring information. For example, spectrum access system 240 may receive a channel availability parameter from sensing device 250, and may store the channel availability parameter along with a channel identifier, a location identifier, and a time identifier associated with the channel availability parameter.

In some implementations, the channel availability information may be based on multiple channel availability parameters associated with the same channel, the same location, and the same time. For example, spectrum access system 240 may receive multiple channel availability parameters (e.g., from the same sensing device 250 and/or base station 220, from different sensing devices 250 and/or base stations 220, etc.). Spectrum access system 240 may process the multiple channel availability parameters to form an aggregate channel availability parameter, and may store the aggregate channel availability parameter along with a channel identifier, a location identifier, and a time identifier associated with the aggregate channel availability parameter.

As an example, sensing device 250 may measure a channel availability parameter at 5:00 PM on ten different days, and may report the channel availability parameter to spectrum access system 240 daily. Spectrum access system 240 may determine an aggregate channel availability parameter by calculating an average (e.g., an overall average, a moving average, a weighted average, etc.) of the reported channel availability parameters (e.g., over all ten reported parameters, over the five most recent reported parameters, etc.). Additionally, or alternatively, spectrum access system 240 may update the aggregate channel availability parameter after new channel monitoring information is received. Spectrum access system 240 may store the aggregate channel availability parameter in association with a channel identifier, a location identifier, and a time identifier associated with the aggregate channel availability parameter.

Additionally, or alternatively, spectrum access system 240 may apply a model (e.g., a propagation model) to received channel monitoring information to determine the channel availability information. For example, spectrum access system 240 may use network information, such as a transmission power parameter of base station 220, a height of base station 220, a location of base station 220, or the like, to model signal propagation and to predict signal interference associated with an unlicensed RF channel. As an example, spectrum access system 240 may use channel monitoring information and a transmission power associated with neighbor base stations 220 (e.g., with overlapping cells) to modify channel availability parameters for those base stations 220.

In this way, spectrum access system 240 may determine and store channel availability information for multiple unlicensed RF channels, multiple locations, and multiple times. Spectrum access system 240 may use the stored channel availability information to recommend one or more unlicensed RF channels for assignment to user device 210, as described below.

As further shown in FIG. 4, process 400 may include receiving a request for a channel recommendation associated with the unlicensed RF spectrum band (block 440). For example, spectrum access system 240 may receive a request, from base station 220, for a channel recommendation associated with the unlicensed RF spectrum band. In some implementations, base station 220 may receive a request, from user device 210, to access the unlicensed RF spectrum band (e.g., to access a network by communicating using the unlicensed RF spectrum band). Based on receiving the request from user device 210, base station 220 may request a channel recommendation from spectrum access system 240 (e.g., via operations support system 230).

In some implementations, the request may identify a location associated with base station 220. Additionally, or alternatively, the request may include a base station identifier, and spectrum access system 240 may determine the location using the base station identifier. Additionally, or alternatively, the request may identify a location associated with user device 210. Additionally, or alternatively, the request may be associated with a time.

As further shown in FIG. 4, process 400 may include determining a set of recommended channels of the unlicensed RF spectrum band based on the channel availability information (block 450). For example, spectrum access system 240 may determine a set of (e.g., one or more) unlicensed RF channels based on the request and based on the channel availability information. In some implementations, spectrum access system 240 may identify a location associated with the request (e.g., a location of base station 220, a location of user device 210, etc.), and may use the location to determine the set of recommended channels. For example, spectrum access system 240 may search a data structure, using a location identifier that identifies the location, to determine channel availability information associated with the location. Spectrum access system 240 may use this channel availability information to recommend a set of unlicensed RF channels to potentially be assigned to user device 210.

Additionally, or alternatively, spectrum access system 240 may identify a time associated with the request (e.g., a current time, a time at which the request was sent, a time at which the request was received, etc.), and may use the time to determine the set of recommended channels. For example, spectrum access system 240 may search a data structure, using a time identifier that identifies the time or a time range that includes the time, to determine channel availability information associated with the time. Spectrum access system 240 may use this channel availability information to recommend a set of unlicensed RF channels to potentially be assigned to user device 210.

In some implementations, spectrum access system 240 may determine a set of recommended channels based on channel availability parameters (and/or aggregate channel availability parameters) associated with different unlicensed RF channels. For example, spectrum access system 240 may recommend a set of channels associated with channel availability parameters that indicate the highest likelihood of channel availability as compared to other channel availability parameters associated with other channels (e.g., at a particular location and time). For example, spectrum access system 240 may recommend a set of channels associated with the highest availability, the lowest occupancy, or the like.

In some implementations, spectrum access system 240 may recommend a single unlicensed RF channel (e.g., associated with the best channel availability parameter). Additionally, or alternatively, spectrum access system 240 may recommend a particular quantity (e.g., a default quantity) of unlicensed RF channels associated with the best channel availability parameters. Additionally, or alternatively, spectrum access system 240 may recommend a set of unlicensed RF channels associated with a channel availability parameter that satisfies a threshold.

In some implementations, spectrum access system 240 may determine the set of recommended channels based on current channel availability (e.g., when sensing devices 250 and/or base stations 220 provide near real-time channel monitoring information to spectrum access system 240). Additionally, or alternatively, spectrum access system 240 may determine the set of recommended channels based on historic channel availability. In this case, spectrum access system 240 may predict the current channel availability based on historic information, and may determine the set of recommended channels based on the predicted channel availability.

As further shown in FIG. 4, process 400 may include providing information that identifies the set of recommended channels (block 460). For example, spectrum access system 240 may provide, to base station 220, a set of channel identifiers that identify the set of recommended channels. In some implementations, spectrum access system 240 may provide the set of channel identifiers to base station 220 via operations support system 230.

In some implementations, spectrum access system 240 may provide information that identifies a recommended order associated with assigning the set of recommended channels. The recommended order may indicate an order in which base station 220 is instructed to attempt to assign the set of recommended channels to user device 210. In this way, base station 220 may use the recommended order to select a channel with a highest likelihood of availability when spectrum access system 240 provides information that identifies multiple channels. For example, the information that identifies the recommended order may include a set of channel availability parameters corresponding to the set of recommended channels. In this way, base station 220 may attempt to assign a first channel associated with a higher likelihood of availability before attempting to assign a second channel associated with a lower likelihood of availability, thereby conserving time and network resources when assigning channels of the unlicensed RF spectrum band. Additionally, or alternatively, spectrum access system 240 may provide channel availability parameters for all channels of the unlicensed RF spectrum, and base station 220 may determine a channel to be assigned based on comparing the channel availability parameters.

Base station 220 may use the set of recommended channels to provide network access to user device 210 via the unlicensed RF spectrum band. For example, if the set of recommended channels includes a single channel, then base station 220 may provide network access to user device 210 via that channel. As another example, if the set of recommended channels includes multiple channels, then base station 220 may select a channel (e.g., as described above), and may provide network access to user device 210 via the selected channel. In some implementations, base station 220 may select a channel based on information that identifies a recommended order received from spectrum access system 240. Additionally, or alternatively, base station 220 may randomly select a channel from the set of recommended channels. In some implementations, base station 220 may attempt to assign a first channel to user device 210. If assignment of the first channel fails (e.g., because the first channel is not available), then base station 220 may attempt to assign a second channel to user device 210 (e.g., based on a recommended order).

In some implementations, spectrum access system 240 may determine not to recommend any channels of the unlicensed RF spectrum band. For example, when none of the channel availability parameters satisfy a threshold (e.g., indicating that no channels are available, that all channels have a high occupancy, etc.), then spectrum access system 240 may provide an indication, to base station 220, that base station 220 is not to assign a channel of the unlicensed RF spectrum band to user device 210. In this case, base station 220 may provide user device 210 with an indication that there are no available channels of the unlicensed RF spectrum band. Additionally, or alternatively, spectrum access system 240 may determine a predicted time when one or more channels of the unlicensed RF spectrum band are predicted to be available (e.g., in a location associated with base station 220, in a location associated with user device 210, etc.), and may provide information that identifies the one or more channels and the predicted time to base station 220. In this case, base station 220 may provide an indication to user device 210 to attempt to reconnect at the predicted time. In this way, network congestion may be reduced and network throughput, reliability, etc. may be improved.

In some implementations, process 400 may be performed for multiple RF spectrum bands. For example, spectrum access system 240 may perform process 400 for an unlicensed RF spectrum band (e.g., the 5 GHz band), a licensed RF spectrum band (e.g., the 3.5 GHz shared band), and/or a combination of one or more unlicensed RF spectrum bands and one or more licensed RF spectrum bands.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein assist with determining channel availability information associated with RF channels of an unlicensed RF spectrum band, and using the channel availability information to recommend a set of channels to be assigned to a user device requesting access to the unlicensed RF spectrum band. In this way, implementations described herein may increase network throughput, improve network reliability, increase network capacity, increase network coverage, etc., by intelligently assigning RF channels of an unlicensed RF spectrum band based on availability of the RF channels.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A server device, comprising:
one or more processors to:
receive channel monitoring information associated with an unlicensed radio frequency (RF) spectrum band,
the channel monitoring information being received from one or more sensing devices associated with a base station and an access point,
the access point being separate from the base station and providing network access via the unlicensed RF spectrum band;
utilize network information, associated with the base station, to model signal propagation and to predict signal interference associated with the unlicensed RF spectrum band:
determine channel availability information associated with one or more channels of the unlicensed RF spectrum band based on the channel monitoring information and based on modeling the signal propagation and predicting the signal interference associated with the unlicensed RF spectrum band,
the channel availability information including one or more channel availability parameters, corresponding to the one or more channels, that indicate availability for communicating via the one or more channels;
receive, from the base station, a request for a channel recommendation associated with the unlicensed RF spectrum band;
determine a set of recommended channels of the unlicensed RF spectrum band based on the channel availability information and the request for the channel recommendation; and
provide, to the base station, information that identifies the set of recommended channels of the unlicensed RF spectrum band,
a user device being provided network access via a particular channel of the set of recommended channels of the unlicensed RF spectrum band.

2. The server device of claim 1, where the one or more processors are further to:
determine a location associated with the request; and
determine the set of recommended channels based on the location.

3. The server device of claim 1, where the one or more processors are further to:
determine a time associated with the request; and
determine the set of recommended channels based on the time.

4. The server device of claim 1, where the one or more processors, when determining the set of recommended channels, are to:
determine the set of recommended channels based on the one or more channel availability parameters.

5. The server device of claim 1, where the set of recommended channels includes a single channel.

6. The server device of claim 1, where the one or more processors are further to:
determine a single channel, of the unlicensed RF spectrum band, associated with a lowest occupancy as compared to one or more other channels of the unlicensed RF spectrum band; and
provide, to the base station, information that identifies the single channel.

7. The server device of claim 1, where the one or more processors are further to:
determine the set of recommended channels based on a set of channel availability parameters, corresponding to the set of recommended channels, included in the channel availability information,
the set of channel availability parameters indicating that the set of recommended channels has a lowest occupancy than one or more other channels of the unlicensed RF spectrum band.

8. A computer-readable medium storing instructions, the instructions comprising:
one or more instructions that, when executed by one or more processors of a server device, cause the one or more processors to:
receive channel monitoring information associated with an unlicensed radio frequency (RF) spectrum band,
the channel monitoring information being received from one or more sensing devices associated with a base station and an access point,
the access point being separate from the base station and providing network access via the unlicensed RF spectrum band;

utilize network information, associated with the base station, to model signal propagation and to predict signal interference associated with the unlicensed RF spectrum band;

determine channel availability information associated with a plurality of channels of the unlicensed RF spectrum band based on the channel monitoring information and based on modeling the signal propagation and predicting the signal interference associated with the unlicensed RF spectrum band, the channel availability information including a plurality of channel availability parameters, corresponding to the plurality of channels, that indicate availability for communicating via the plurality of channels;

receive, from the base station, a request for a channel recommendation associated with the unlicensed RF spectrum band;

determine one or more recommended channels of the unlicensed RF spectrum band based on the channel availability information and the request for the channel recommendation; and provide, to the base station, information that identifies the one or more recommended channels of the unlicensed RF spectrum band, a user device being provided network access via a particular channel of the one or more recommended channels of the unlicensed RF spectrum band.

9. The computer-readable medium of claim 8, where the channel monitoring information includes information determined based on monitoring the plurality of channels at a plurality of locations, and the instructions further comprise:

one or more instructions that, when executed by the one or more processors, cause the one or more processors to:

determine the channel availability information based on the plurality of channels and the plurality of locations.

10. The computer-readable medium of claim 8, where the channel monitoring information includes information determined based on monitoring the plurality of channels at a plurality of times, and the instructions further comprise:

one or more instructions that, when executed by the one or more processors, cause the one or more processors to:

determine the channel availability information based on the plurality of channels and the plurality of times.

11. The computer-readable medium of claim 8, where the channel monitoring information includes the plurality of channel availability parameters corresponding to the plurality of channels, and the instructions further comprise:

one or more instructions that, when executed by the one or more processors, cause the one or more processors to:

determine the channel availability information based on the plurality of channel availability parameters and the plurality of channels.

12. The computer-readable medium of claim 8, where the one or more sensing devices monitor one or more channels of the unlicensed RF spectrum band.

13. The computer-readable medium of claim 8, where the one or more sensing devices are incorporated in the base station.

14. The computer-readable medium of claim 8, where the instructions further comprise:

one or more instructions that, when executed by the one or more processors, cause the one or more processors to:

apply a propagation model to the channel monitoring information to determine the channel availability information.

15. A method, comprising:

receiving, by a server device, channel monitoring information associated with an unlicensed radio frequency (RF) spectrum band, the channel monitoring information being received from one or more sensing devices associated with a base station and an access point, the access point being separate from the base station and providing network access via the unlicensed RF spectrum band;

utilizing, by the server device, network information, associated with the base station, to model signal propagation and to predict signal interference associated with the unlicensed RF spectrum band;

determining, by the server device, channel availability information associated with a plurality of channels of the unlicensed RF spectrum band based on the channel monitoring information and based on modeling the signal propagation and predicting the signal interference associated with the unlicensed RF spectrum band, the channel availability information including a plurality of channel availability parameters, corresponding to the plurality of channels, that indicate availability of the plurality of channels;

receiving, by the server device and from the base station, a request for a channel recommendation associated with the unlicensed RF spectrum band;

determining, by the server device, one or more recommended channels of the unlicensed RF spectrum band based on the channel availability information and the request for the channel recommendation; and providing, by the server device and to the base station, information that identifies the one or more recommended channels of the unlicensed RF spectrum band, a user device being provided network access via a particular channel of the one or more recommended channels of the unlicensed RF spectrum band.

16. The method of claim 15, further comprising:

determining that each of the one or more recommended channels are associated with a channel availability parameter that satisfies a threshold; and determining the one or more recommended channels based on determining that each of the one or more recommended channels are associated with the channel availability parameter that satisfies the threshold.

17. The method of claim 15, further comprising:

predicting a current channel availability based on the channel availability information; and determining the one or more recommended channels based on predicting the current channel availability.

18. The method of claim 15, where the one or more recommended channels includes multiple channels; and where the method further comprises:

determining a recommended order associated with assigning the multiple channels; and providing, to the base station, information that identifies the recommended order.

19. The method of claim 15, further comprising:

receiving multiple channel availability parameters associated with a channel of the plurality of channels;

determining an aggregate channel availability parameter, of the plurality of channel availability parameters, corresponding to the channel based on the multiple channel availability parameters associated with the channel; and determining the one or more recommended channels based on the aggregate channel availability parameter.

20. The method of claim 15, further comprising:

receiving a first channel availability parameter associated with a channel, of the plurality of channels, and associated with a first location;

receiving a second channel availability parameter associated with the channel and associated with a second location that is different from the first location;

determining an aggregate channel availability parameter, of the plurality of channel availability parameters, corresponding to the channel based on the first channel availability parameter and the second channel availability parameter; and determining the one or more recommended channels based on the aggregate channel availability parameter.

* * * * *